United States Patent [19]

Gillard et al.

[11] 4,104,634
[45] Aug. 1, 1978

[54] GROUND PLANE CORNER REFLECTORS FOR NAVIGATION AND REMOTE INDICATION

[75] Inventors: Paul O. Gillard, Salisbury; Kenneth B. Whiting, Tea Tree Gully, both of Australia

[73] Assignee: The Commonwealth of Australia, Parkes, Australia

[21] Appl. No.: 746,152

[22] Filed: Nov. 30, 1976

Related U.S. Application Data

[63] Continuation of Ser. No. 536,617, Dec. 26, 1974, abandoned.

[30] Foreign Application Priority Data

Jan. 3, 1974 [AU] Australia .............................. PB6147

[51] Int. Cl.$^2$ ...................... H01Q 15/00; H01Q 15/14
[52] U.S. Cl. ..................................... 343/18 C; 343/912
[58] Field of Search .............................. 343/18 C, 912

[56] References Cited

U.S. PATENT DOCUMENTS

| 2,352,862 | 7/1944 | Rabuse ................................ 343/18 C |
| 2,472,212 | 6/1949 | Hudspeth ........................ 343/912 X |
| 2,793,362 | 5/1957 | Oberg ................................ 343/18 C |
| 2,872,675 | 2/1959 | Kennaugh ........................ 343/18 C |
| 2,922,158 | 1/1960 | Hardwick et al. ................. 343/18 C |
| 3,016,532 | 1/1962 | DelMar ............................. 343/18 D |
| 3,019,457 | 2/1962 | Lowery ............................ 343/18 C |
| 3,130,406 | 4/1964 | Jones-Hinton et al. ........... 343/18 C |
| 3,137,852 | 6/1964 | Hopper ............................. 343/18 C |

Primary Examiner—Malcolm F. Hubler
Attorney, Agent, or Firm—Haseltine, Lake & Waters

[57] ABSTRACT

A device to be used as a guidance system for sonar or radar or similar transmissions in which a dihedral reflector is used in association with part of the earth's surface (land or sea) whereby a trihedral reflector results for such transmissions in which spurious signals are avoided because the earth forms one of the reflective surfaces to thereby remove spurious signals which could otherwise occur with a normal trihedral reflector.

16 Claims, 19 Drawing Figures

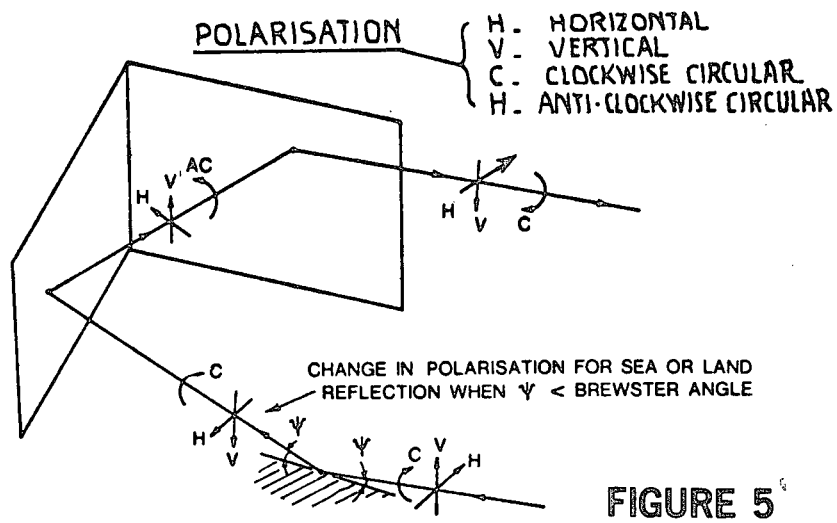
FIGURE 5
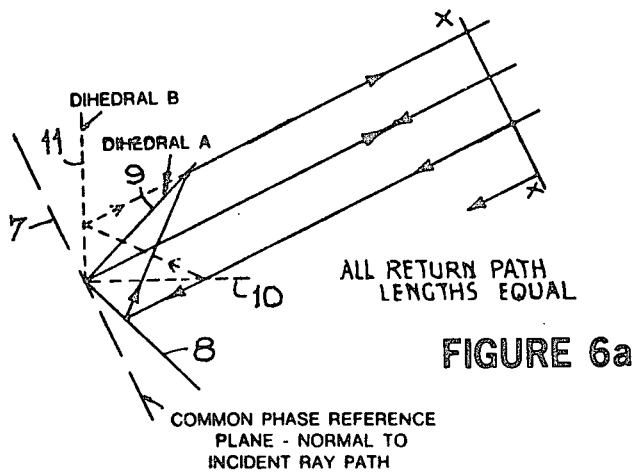
FIGURE 6a
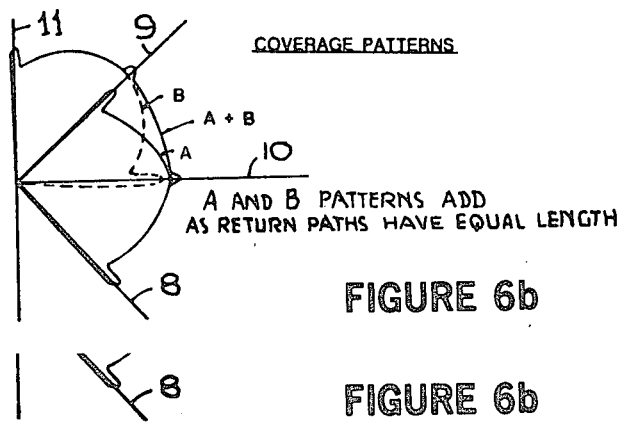
FIGURE 6b
FIGURE 6b

OMNIDIRECTIONAL REFLECTOR

— FIXED SECTIONS
--- MOVEABLE SECTIONS

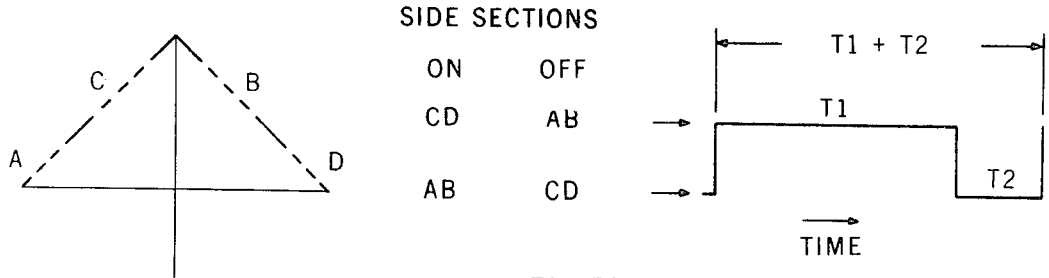

| SIDE SECTIONS | |
|---|---|
| ON | OFF |
| CD | AB |
| AB | CD |

T1, T2 OR THEIR RATIOS MAY BE USED FOR INDICATION OR REMOTE INDICATION OR THE ABSOLUTE TIMES OF THEIR TRANSITIONS MAY BE USED FOR THESE PURPOSES

AZIMUTH PATTERN

DIRECTION OF CONSTANT REFLECTIVITY

ERROR TO PORT
HIGHER BRIGHTNESS
FOR T2
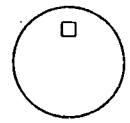 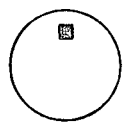

ERROR TO STARBOARD
HIGHER BRIGHTNESS
FOR T1
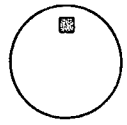 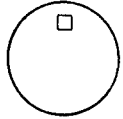

ON COURSE
BRIGHTNESS CONSTANT
FOR T1 AND T2
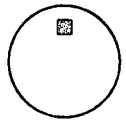 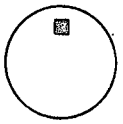

T1     T2

PPI DISPLAY

FIGURE 13

GROUND PLANE CORNER REFLECTORS FOR NAVIGATION AND REMOTE INDICATION

CROSS-REFERENCE TO RELATED APPLICATION

The present application is a continuation of the parent application Ser. No. 536,617, filed Dec. 26, 1974, now abandoned.

FIELD OF THE INVENTION

In the general field of Navigation it is necessary to provide beacons to indicate the position of airfields, ports, or other localities, to indicate navigation lanes or paths, and to indicate conditions which may influence navigation such as weather. This invention relates to reflective beacons for use with radar and radar-like navigation systems which operate with electromagnetic and sonar energy.

THE PRIOR ART

Since 1946 the design of radar corner reflectors for navigation has mainly been based on a study by Robertson, Sloan D. ("Targets for microwave Radar Navigation." Bell System Tech. Journal Vol. 26, pp 852 to 869. Oct. 1947) which describes the operation of a trihedral reflector comprising three mutually perpendicular flat conducting plates. This type of reflector provides a relatively large radar reflectivity over a wide solid angle, since it reflects a large part of the incident energy from a distant radar in the direction of the radar with little added dispersion. It has therefore found considerable use as a passive radar beacon to indicate position. However, when such a reflector is placed near the ground and is illuminated by an elevated radar, there are two sets of ray paths possible, the direct rays, and the indirect rays which reach the thrihedral after reflection from the ground or sea. At glancing incidence and for a reasonably flat terrain or sea, these two sets of rays have very similar magnitude, and significant interference effects therefore occur at both the reflector and the radar, leading to a lobe structure for the vertical pattern of the reflector. Secondly individual reflectors have a restricted beamwidth which reduces their use as navigation aids. These problems are partly overcome by using an array or cluster of small trihedral reflectors having different phase planes (Skolnik Merril I. Radar Handbook, McGraw Hill, 1970 Ed. Section 31 – 34 and 31 – 35) and although this reduces the effect of nulls due to ground reflections other nulls may now occur caused by destructive interference between the individual reflectors in the cluster. Thus the overall efficiency of the cluster reflector is generally low.

In some applications it is necessary to provide reflectors of very large reflectivity so that they are visible in a high clutter environment such as in the vicinity of airfields. Large conventional trihedrals are very difficult to manufacture with sufficient accuracy. Also they are inevitably high which makes them not very suitable for use on airfields. Other types of reflector include dielectric lenses, such as the Luneberg lens, or the "Helisphere" reflector (Croney, S. Delany, W.D. "A New Type of Omniazimuthal Radar-Echo Enhancer", Microwave Journal Vol 6, pp 105 – 109 March 1963), which reflect the incident energy and collimate it in the direction of the source as in the trihedral reflector. These types of reflector can provide omnidirectional coverage without nulls in the azimuth plane, but they cannot be manufactured in sufficiently large sizes to be economically useful in the high clutter environment normally found in navigation application. It has also been found that rain clutter can be reduced by the use of a same sense circularly polarised radar transmissions and a number of complex reflectors have been described which respond to such transmission, (e.g. Worterdyke, D. R. and Rudduck, R. C. "Metallic Post Corner Reflectors for Same-Sense Circular Polarisation". The Microwave Sound, Dec. 1970, and U.S. Pat. No. 2,872,675 for a Dielectric Reflector Patented Feb. 3, 1959). Most of these reflectors are expensive and can only be made in small sizes.

These disadvantages in passive reflectors have in the past led to the development of active transponder and responder radar beacons comprising receivers and transmitters which on interrogation transmit a return signal to the source radar. Such beacons require a power source, are generally expensive to provide and to maintain, tend to have a limited frequency range, and generally only suit a particular class of radar equipment. Also the signals transmitted by such beacons add to the congestion of the available radio spectrum, and can cause unwanted interference to radars and other systems.

For aircraft navigation, highly reliable beacons are needed and, special active systems are now normally used, such as DME or TACAN. Such systems however, require special type equipment solely for their purpose in the aircraft. For sea navigation and control of shipping similar problems exist.

A related navigational problem is a means of accurately indicating a given approach angle. For example in the case of aircraft navigation it is particularly important that a given guide slope angle is maintained for the landing phase. Current techniques largely depend on active systems such as ILS ("Reference Data for Radio Engineers" I.T.T. 5th Ed. pp 322) which makes use of the polar pattern of a multiple antenna system located at an airfield. An accurate approach angle is obtained by adjusting the track to maintain equality in the signals transmitted from different antennas. The ILS and similar active systems suffer from the disadvantage that special equipment is required in the aircraft solely for this purpose.

For ships it is also important that the track is maintained within prescribed channels or lanes, especially at a harbour entrance and in rivers. There does not appear to be a generally accepted all-weather aid for defining such approach lanes, except by means of a fixed surveillance radar from which navigational instructions are relayed to the ship.

It is also well known that it is difficult to provide a large radar target of accurately known reflectivity near the earth's surface, for the precise measurement and calibration of radars in a clutter environment, because of the interference effects caused by the ground reflection.

OBJECTIVES AND SUMMARY OF THE INVENTION

The objective of the present invention is to provide an improved reflector system for navigation and related purposes and for remote indication, in which is free from unwanted nulls in the coverage pattern, in which the angular beam width can be controlled over a wide range of azimuth and elevation angles, and which can be manufactured economically to have a large reflectivity. It is primarily intended for use at radar frequencies with vertical, horizontal, and same-sense circular polarisation of the radar transmissions, and at low elevation angles (below the Brewster angle for the natural ground reflecting surface) most frequency used for navigation. The invention is also intended to be applied in other bands in the electro-magnetic spectrum, and for sonar systems in air sea or other transmission media.

Briefly the invention comprises pairs of reflecting surfaces and the ground or sea surface, these three surfaces forming a 90° trihedral reflector such that the main signal which is returned to the source has always been "ground" reflected. By "ground" is meant any continuity forward of the reflector which is or simulates the ground or sea surface.

The trihedral reflector so formed by these three surfaces differs from the prior art in one or more of the following, namely: In the way in which (a) the "ground" surface is always used as an essential reflecting surface;

(b) the "ground" reflection constants are used for angles below the Brewster angle to obtain high efficiency for same-sense circular polarisation transmissions;

(c) each pair of plates of a signal reflector can be shaped to control the beamwidth in elevation and azimuth;

(d) reflectors can be grouped such that their patterns add in common phase to produce a combined pattern without serious interference nulls;

(e) reflectors can be grouped such that their patterns provide remote indication of a given approach angle; and (f) modulation by mechanical means can be used to improve detection probability to provide identification and to provide remote indication. These reflectors are therefore expected to have wide application as relatively cheap beacons for autonomous aircraft and marine navigation using existing radars commonly used for weather surveillance and navigation purposes, or in the long term special purpose radars developed specifically to exploit the characteristics of these reflectors.

Also these reflectors may be designed for application in sonar systems for marine, submarine or other applications, in which the air-ground, air-sea or sea-ground interfaces are used as the "ground" reflecting surface. Also the dihedral plates may be located so as to use the air-sea reflecting surface for marine or submarine applications.

DESCRIPTION OF DRAWINGS

FIG. 5 shows the direction of the horizontal and vertical electric vectors before and after reflection at the ground and at the two conducting surfaces of the ground plane corner reflector for small grazing angles below the Brewster angle.

FIG. 6A shows two ground plane corner reflectors facing different directions but located such that their dihedral plates have a common line of intersection. Thus both reflectors have a common phase reference plane which rotates such that it is always normal to the incident ray path and it follows that the return path lengths from a distant part of the wave front (xx) for rays reflected from both reflectors are equal.

FIG. 6B shows that as a result of the equal return path lengths for the two ground plane corner reflectors, signals from the two reflectors add in common phase and their respective polar patterns therefore add without mutual interference.

FIG. 13 shows how a single ground plane corner reflector with movable plates can be mechanically switched by moving the plates out of their normal planes by a few degrees between port and starboard beams to indicate a given azimuth approach bearing or channel (as obtained by a pair of ground plane corner reflectors described in FIG. 12). It also indicates how the switching period or times can be used for remote indication.

DETAILED DESCRIPTION OF PREFERRED EMBODIMENT

Figure 1:
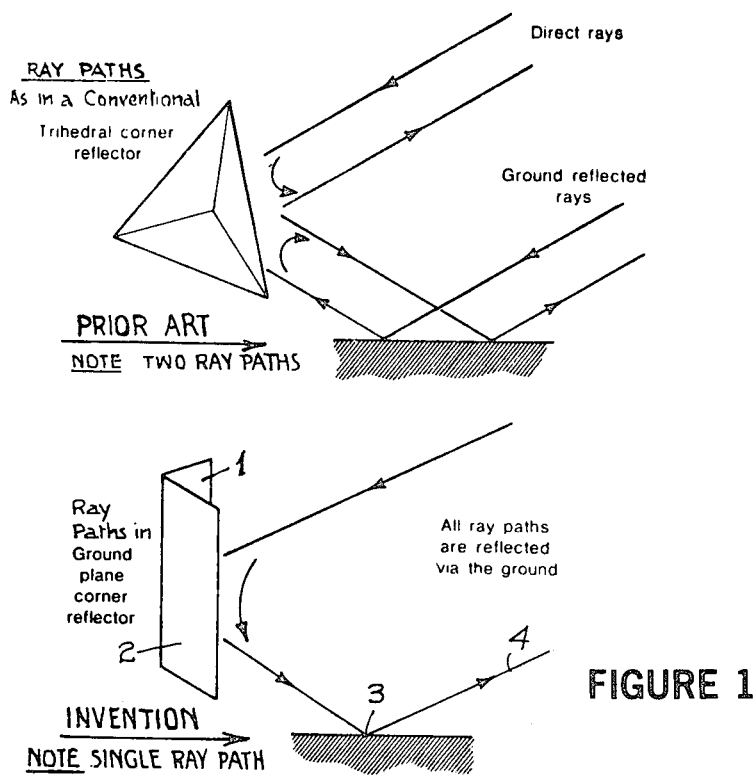
FIG. 1 shows the essential feature of the ground plane corner reflector which distinguishes in from the conventional trihedral reflector namely that it primarily operates with the set of rays which are reflected via the "ground" reflecting surface.

FIG. 1 and the summary of this invention above describe the essential features of the "Ground Plane Corner Reflector." These features are embodied in a number of applications which are described as follows.

For efficient operation of the ground plane corner reflector it is necessary that the three reflecting planes 1, 2 and 3 shown in FIG. 1 are mutually perpendicular and that the ground reflecting surface is sufficiently flat that it behaves as a single reflecting plane. By these means the majority of backscatter rays one of which is indicated at 4 are reflected once only by each vertical plate, and by the "ground" surface in the Fresnel reflection zone, as occurs in a conventional trihedral operating in "free space", the rays being not necessarily reflected in the order indicated.

No other ray paths of comparable amplitude, either direct rays arising from edge diffraction or via the ground, which normally cause interference nulls in a conventional reflector, are possible except at extremely small glancing angles. For low elevation angles the allowable tolerance on ground surface roughness in the reflection zone increases with distance in front of the reflector but for normal radar frequencies is always more than one or two inches. For higher elevation angles it is desirable to provide a more accurate flat conducting or dielectric surface (such as concrete or metal) near the apex of the dihedral and to modify the shape of the flat dihedral plates as described further below, to improve efficiency at these angles. Also it may be necessary to take special precautions when reflections occur near the Brewster angle, as will be referred to later herein. At low elevation angles such a reflector has an on-axis reflectivity which can be nearly four times that of the simple dihedral of similar size.

In azimuth the reflectivity falls off to the half power point for a deviation of ± 22½° approximately. In elevation the reflectivity tapers off at a rate dependent upon polarisation and the ground electrical parameters. It is possible to provide enhanced reflectivity near the zenith by shaping the horizontal reflecting surface near the apex of the dihedral.

This type of reflector having a size of approximately 32 ft side and a height of 2 ft has a reflectivity at small elevation angles which is comparable to that of a large aircraft hanger. For this reason and because of its low profile and ease of construction as a frangible structure, it has high potential for use as an airfield navigation beacon and landing aid.

When used in other geometrical configurations such as on a high cliff or lighthouse or other stable elevated land or sea platform it also has high potential use as a marine navigation beacon.

In general the efficient operation of the ground plane corner reflector depends on reflection from a surface or interface where there is an impedance mismatch or discontinuity. The ground reflection surface as already defined above in the context of electro-magnetic propagation also applies to sonar propagation. In sonar application using sea as the propagating medium it is therefore intended by means of this invention that the dihedral plates may be located at depth to use the seabed as the reflecting surface, or located just below the sea surface to use the sea-air interface as the "ground" reflecting surface. Moreover for these undersea applications the dihedral plates may be solid or otherwise constructed to provide the appropriate impedance mismatch required for reflection.

Figure 2:
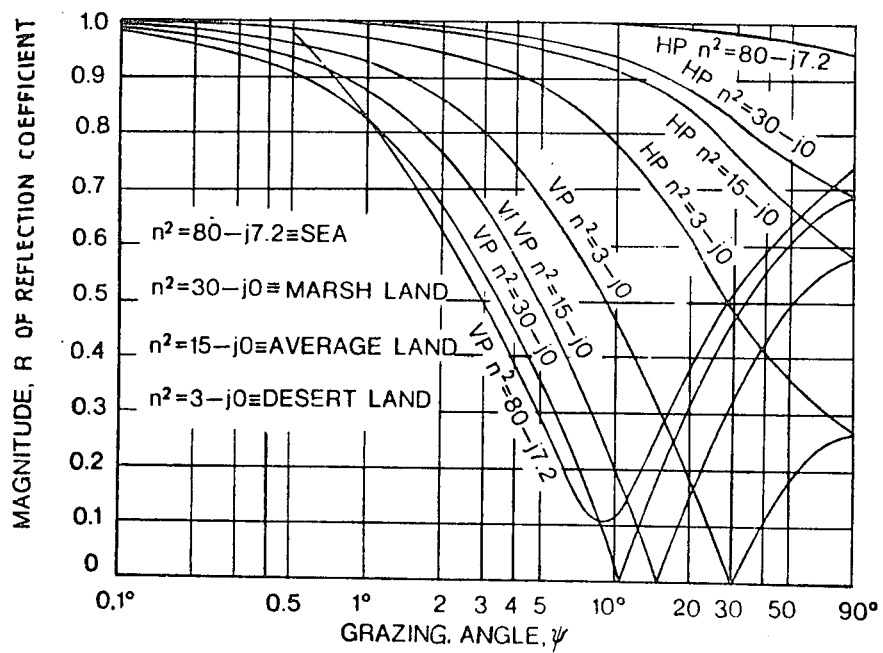
FIG. 2 shows the magnitude of the reflection co-efficient at various grazing or elevation angles $\psi$ for smooth sea and smooth terrain at a typical radar frequency of 9 Ghz. It would be noted that for small grazing angles the reflection co-efficient is nearly unity for both horizontal and vertical polarisation and that it falls to near zero at the Brewster angle (e.g. at 10.5° for marshland with vertical polarisation).

The efficiency of the ground plane corner reflector for various polarisations and elevation angles of the radar also varies with the reflection constants of the ground reflecting surface. These are shown for radar frequencies in FIG. 2 and 3. For vertical and horizontal polarisation the efficiency depends on the magnitude R of the reflection coefficient which is shown in FIG. 2 falls near the Brewster angle.

In aircraft navigation it may be important to obtain efficient operation of the ground plane corner reflector near the Brewster angle. This can be made possible by modifying a natural ground surface in the Fresnel zone such as by laying a wire mesh to obtain increased magnitude for the reflection coefficient.

Figure 3:
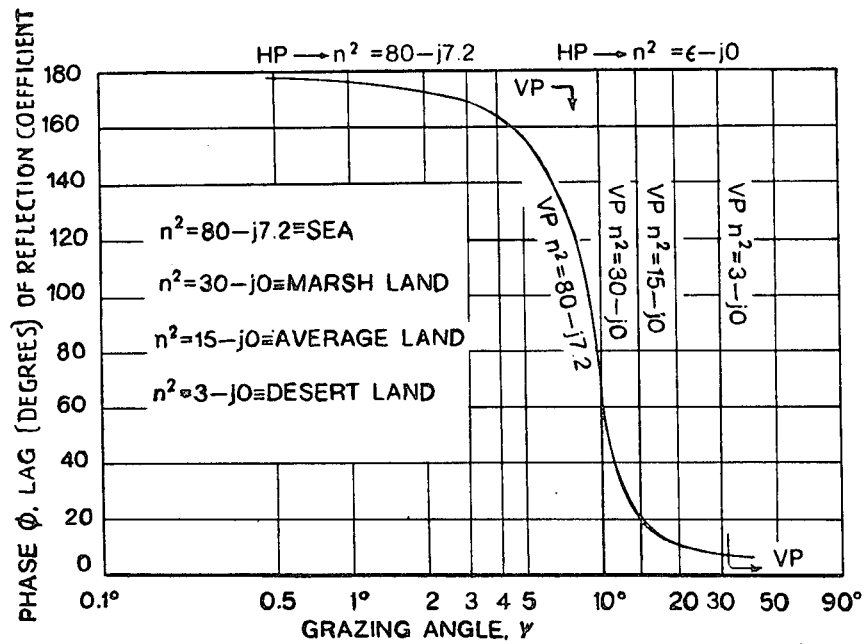
FIG. 3 shows the phase lag $\phi$ as a function of grazing angle for reflection from smooth sea and smooth terrain at a typical radar frequency of 9Ghz. It will be noted that for very small grazing angles, both horizontally and vertically polarised signals suffer a phase lag of approximately 180° on reflection and that above the Brewster angle the phase lag for vertical polarised signals tends to 0°.
Figure 4:
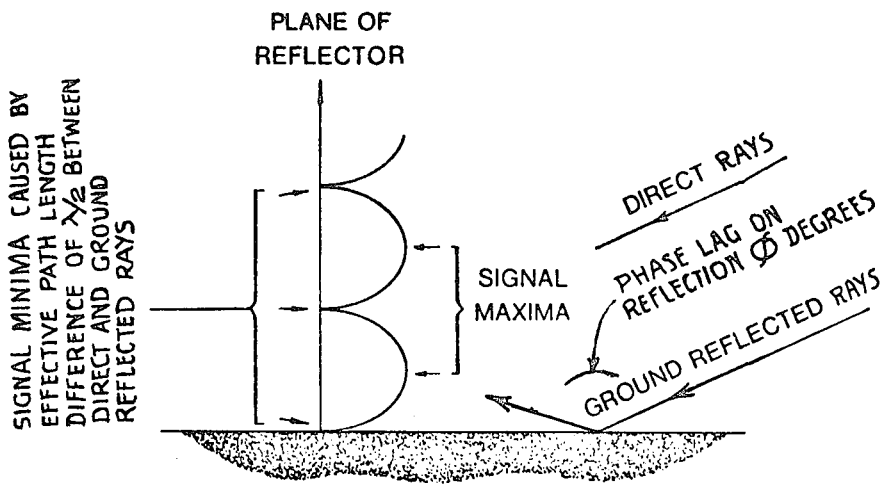
FIG. 4 shows how the illumination intensity at the reflector changes with height due to interference between the direct and ground reflected rays. It will also be noted that the position of the minima can vary widely with the height and range of the illuminating radar and with frequency.

The phase lag $\phi$ of the reflection coefficient shown in FIG. 3 alters the position of the signal maxima and minima which are shown in FIG. 4 but, it does not seriously alter the efficiency of the ground plane corner reflector for vertically and horizontally polarised radar signals. The phase lag however does have a profound effect on the performance of the ground plane corner reflector for same-sense circular polarised signals as described below.

FIG. 4 indicates that for efficient operation the dihedral plates of the reflector should be located where they intercept at least one signal maxima in the vertical lobing patterns of the radar, which exists at the plane of the reflector. This lobe structure changes markedly with radar elevation angle and frequency and in applications where wide variations in these parameters will occur it is necessary to use a dihedral of sufficient vertical extent to ensure that adequate energy is always intercepted for reflection to the radar.

A further application of the ground plane corner reflector concerns radar calibration. It can be shown that under certain conditions, especially at low elevation angles, the position of the first maxima in the lobe structure shown in FIG. 4 can be accurately determined. Furthermore from FIG. 2 and 3 it is evident that the reflection coefficients for ground at low elevation angles can be determined accurately for low elevation angles, and for both horizontal and vertical polarisation. These properties can be applied to the design of an accurate ground plane corner reflector of high reflectivity for use as a standard for the calibration of radars, especially in a large clutter environment. It is evident from the above that such reflectors may be used for calibration of radars employing horizontal and vertical polarisation, and it will be shown below that such a reflector may also be used at low elevation angles for the calibration of radars which employ same-sense circular polarisation.

Same-sense circular polarisation is one means which is employed in modern radar design of improving performance in heavy rain, by reducing rain clutter. A reflector having two conducting surfaces such as a "free space" dihedral or the "Helisphere" already mentioned above reflects circular polarisation without change in the sense of rotation of the vector. These types of reflectors are therefore visible with such radars but they have limitations in beamwidth and reflectivity which restrict their use. Although the ground plane corner reflector has a third reflecting surface, the ground surface for elevation angles below the Brewster angle behaves as a dielectric which modifies its reflection properties for circular polarisation signals. FIG. 5 shows the polarisation characteristics of the "free space" dihedral and of the ground for angles below the Brewster angle. It shows that for same-sense circular polarisation (in this case clockwise rotation) the direction of rotation after reflection from the "ground" surface is unchanged since both the horizontal and vertical components have suffered a phase lag of approximately 180°. Therefore the ground plane corner reflector at small elevation angles below the Brewster angle has the same polarisation properties as those of the "free-space" dihedral, namely that there is no resultant change in the direction of circularly polarised signals. This is a most important characteristic which distinguishes this reflector from the conventional trihedral reflector having three conducting surfaces.

The azimuth beamwidth of the Ground Plane Corner Reflector is approximately 45° beyond which it falls sharply. However for navigation purposes it is often necessary to provide a wider angular coverage sometimes as much as the 360°. This can be obtained with the Ground Plane Corner Reflector by using a number of individual reflectors each facing different directions, in such a way that their patterns add without mutual interference. FIG. 6A shows how this can be arranged by ensuring that the individual dihedrals have a common phase reference plane. In this context the phase reference plane 7 is that plane which phases through the point of intersection of the planes of the dihedral plates 8 and 9 (shown as the dihedral A) and of the plane of the Fresnel zone of the "ground" reflecting surface, and which is always normal to the incident ray paths from the radar, as shown by the angularly displaced dihedral plates 10 and 11 (shown as the dihedral B).

It can be shown geometrically that the total return path length from a given part of the wave front (xx on the figure) to dihedrals A and B in FIG. 6A equals twice the distance from xx to the common phase reference plane. Therefore reflected signals from both dihedrals A and B add in common phase to produce the combined interference free pattern as shown in FIG. 6B.

It will also be noted that as all reflections appear to emanate from a well defined reference plane, which can be located in space to a fraction of a wavelength, the Ground Plane Corner Reflector has application for distance measurement and for such applications as "docking" where range precision is required.

Figure 7:
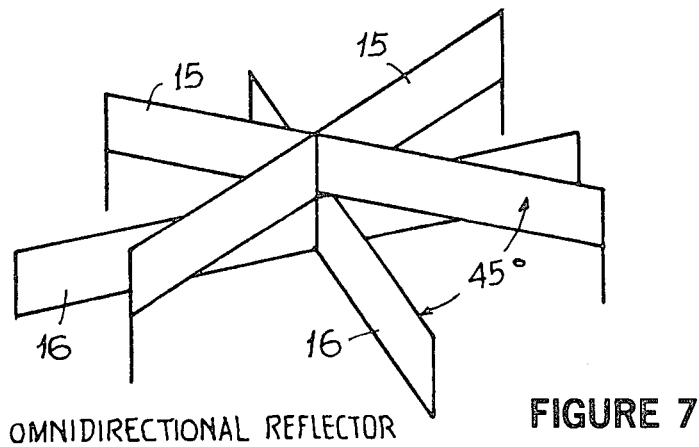
FIG. 7 shows how dihedrals can be stacked such that their separate polar patterns add to provide an omnidirectional beacon without there being interference nulls.

FIG. 7 indicates how a simple low profile omnidirectional reflector for aircraft navigation at low elevation angles may be constructed using eight dihedrals composed of the two sets of vertically stacked intersecting plates 15 and 16. If it is necessary to achieve efficient operation for higher elevation angles, it is desirable to shape the dihedral plates according to the maximum required elevation angle as described further below.

In order to shape the azimuth and elevation beamwidth of the Ground Plane Corner Reflector, it is necessary to control the ray paths that can operate. For this purpose it is necessary to define the three separate sets of rays shown in FIG. 8 which may operate in a Ground Plane Corner Reflector.

(a) The bi-directional rays which have their ground reflection in front of the port plate of the dihedral.

(b) The bi-directional rays which have their ground reflection between the plates of the dihedral.

(c) The bi-directional rays which have their ground reflection in front of the starboard plate of the dihedral.

For reflectors which use only one or two of these sets of rays it is apparent that only that part of the ground in front of the reflector or between the reflector plates, which is used in the reflection process, is required to have a specified reflectivity.

Figure 8:
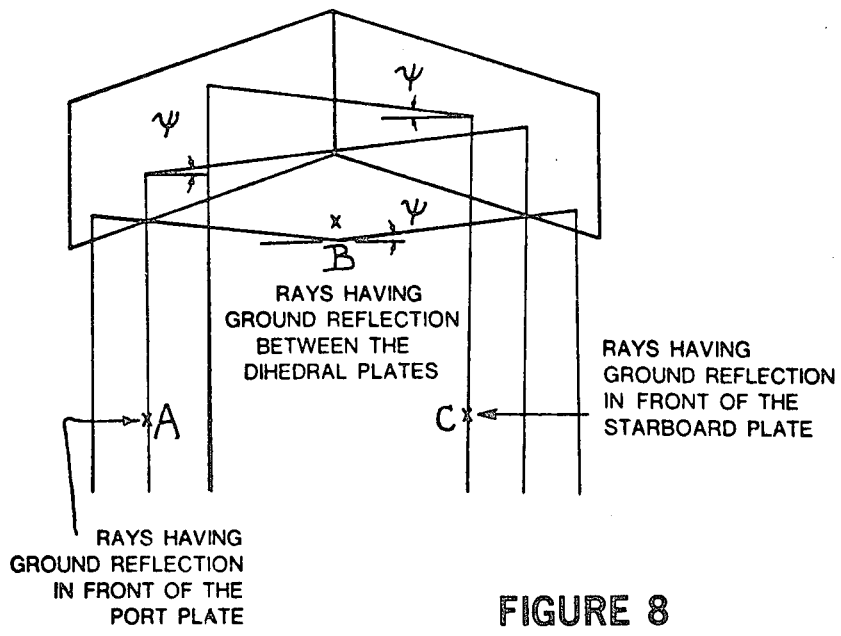
FIG. 8 shows the three "ground" reflection zones which occur for a ground plane corner reflector in which the dihedral plates are resting on the ground reflecting surface. It is noted that for a given grazing or elevation angle $\psi$ the ray paths continue to rise or fall at this grazing angle as they pass between the conducting plates of the dihedral, and that by appropriately shaping the dihedral plates still witin the same planes it is possible to control reflection zones which can operate and to restrict the elevation angles for which reflections are possible.
Figure 9:
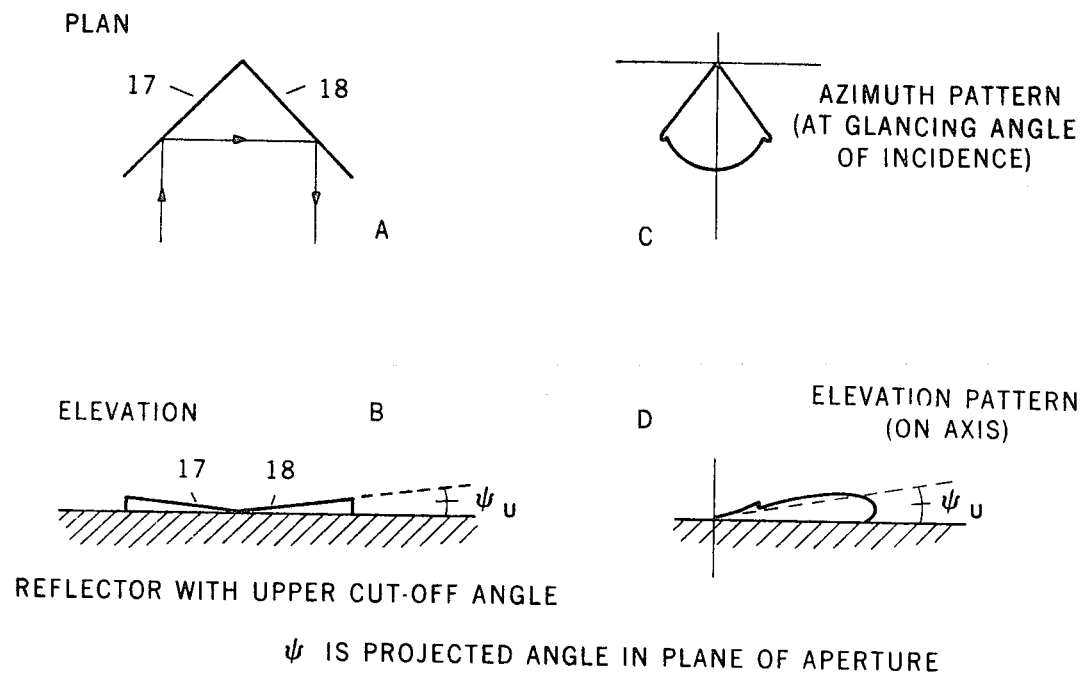
FIG. 9 shows how the properties described in FIG. 8 can be used to shape the dihedral plates in order to obtain a ground plane corner reflector having a upper cut-off angle in the elevation plane.

In navigational problems such as the indication of glide slope angle it is desirable to provide reflectors which have sharp upper or lower cut-off angles in the elevation plane. By means of this invention the vertical plates of a Ground Plane Corner Reflector are shaped to control the elevation pattern by controlling the angles which ray paths can follow. The ray path angles are shown in FIG. 8. Thus a low profile Ground Plane Corner Reflector comprising triangular plates 17 and 18 arranged vertically in the form of a dihedral as shown at A and B with one side at or near ground level and having zero height at the apex of the dihedral as shown in FIG. 9, has a sharp cut-off above a given elevation angle $\psi$ as shown at D. The azimuth pattern of the reflector at small elevation angles is shown at C. Alternatively a Ground Plane Corner Reflector as shown in FIG. 10 in which the height of the lower edge of one plate 20 and of the upper edge of the other vertical plate 21 increases from one extremity of the dihedral through the apex to the other extremity with the edges coinciding at the apex, exhibits an on-axis vertical beamwidth which has a sharp cut-off below a given elevation angle.

Figure 10:
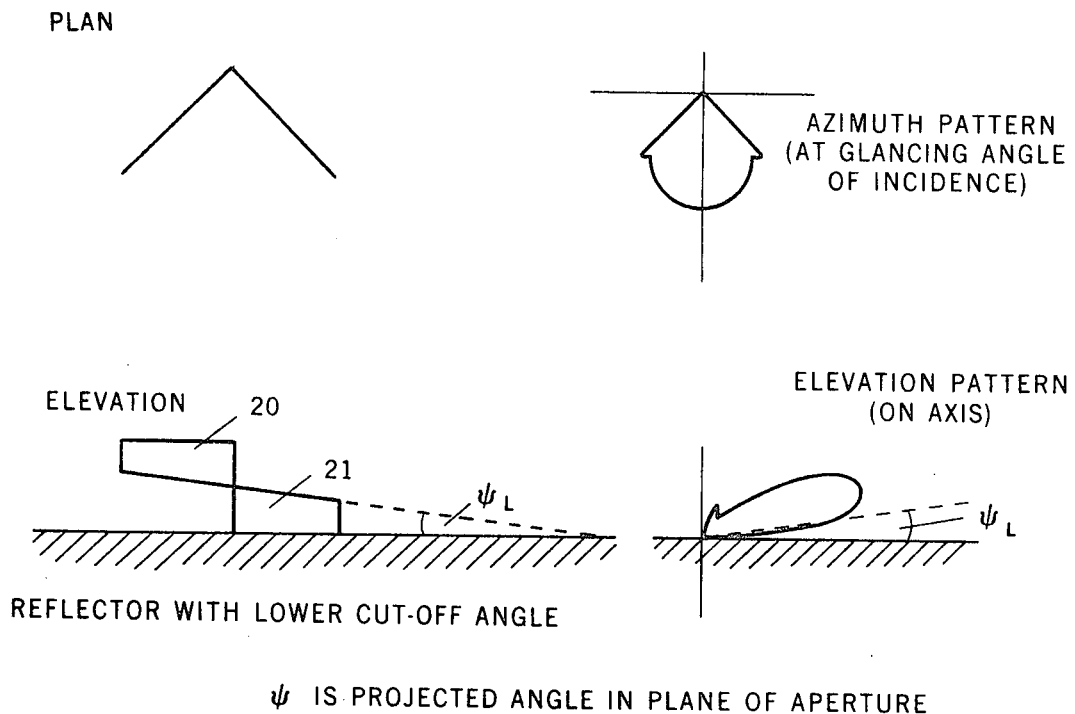
FIG. 10 shows how the properties described in FIG. 8 can be used to shape the dihedral plates in order to obtain a ground plane corner reflector having a lower cut-off angle in the elevation plane.
Figure 11:
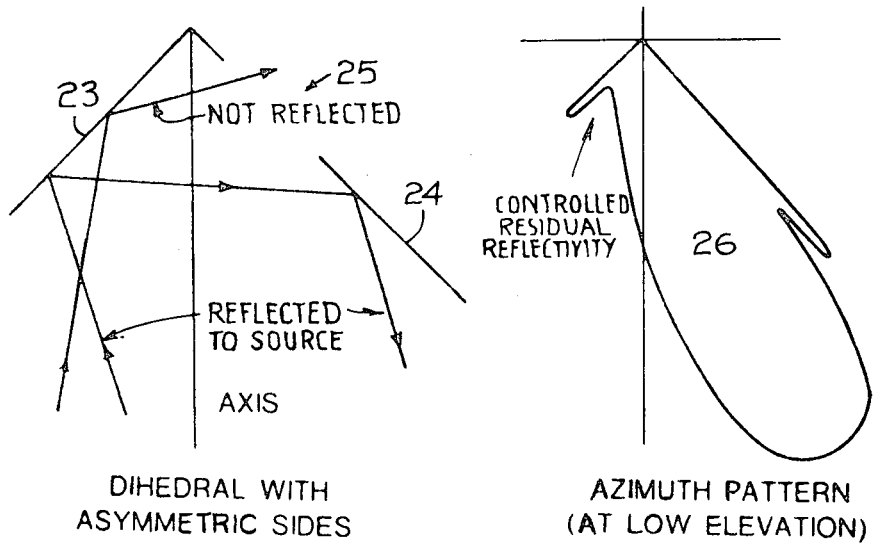
FIG. 11 shows how the ground plane corner reflector can be used with asymmetric dihedral plates to provide a starboard beam having a high cut-off rate on axis and controlled residual reflectivity near cut-off.

It also follows from the principle used in FIGS. 9 and 10 that by omitting sections of the length of the dihedral plates, it is possible to produce assymetric azimuth beams. FIG. 11 shows how plates 23 and 24 and the gap 25 in the plate 24 might be located to produce a starboard beam 26 and it is clear that a complimentary arrangement of the dihedral plates will produce a port beam.

It should be noted that the types of shaped beam reflectors described in FIGS. 8 to 11 have the advantage that the shape of their beams is virtually independent of frequency over a wide range, provided the dimensions of the plates are large compared with the operating wavelength.

Figure 12:
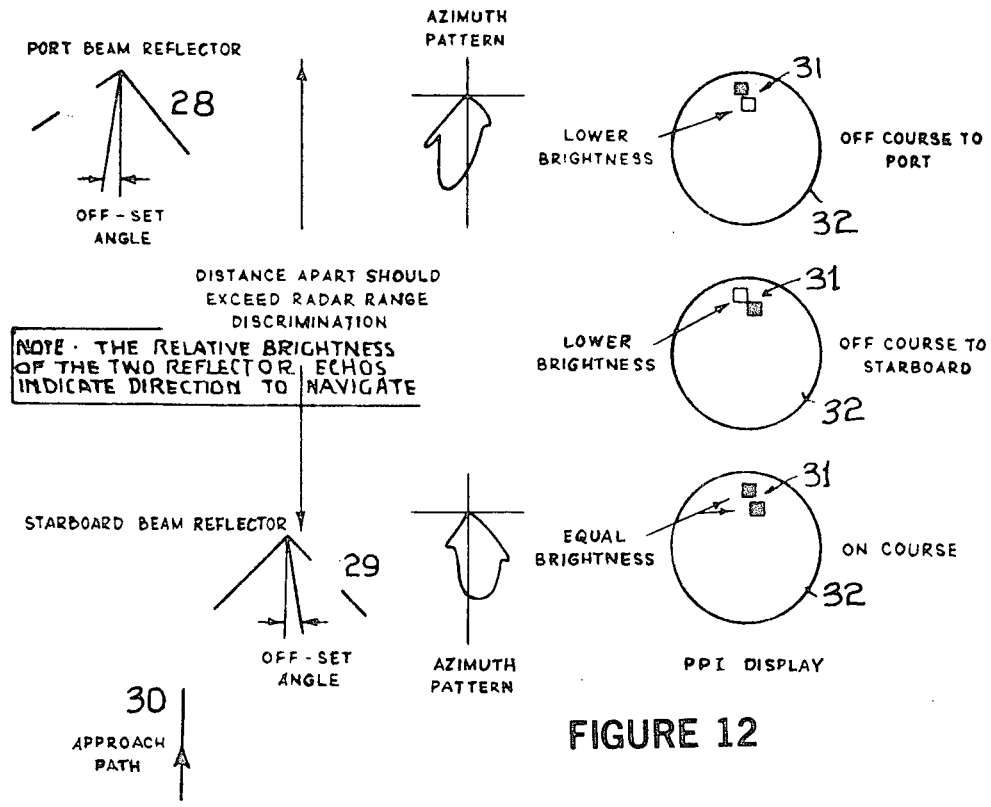
FIG. 12 shows how a radar beacon consisting of a complimentary pair of ground plane corner reflectors having port and starboard beams can be used to provide a remote indication on a radar ppi (plan position indication) display of a given azimuth approach angle or navigation channel and of the required change in the direction of heading to navigate to this channel.

By locating complimentary pairs of reflectors, such as a pair having upper and lower elevation cut-off beams, or a pair having port and starboard beams, so that each reflector of a pair is located in different range cells of a radar and such that they do not obscure each other, it is possible to arrange that their beams cross over at given elevation or azimuth approach angles. By this means a pair of such reflectors can be considered as a beacon which remotely indicates a given navigational approach path or channel either in azimuth or elevation. FIG. 12 shows how a port and starboard reflector pair respectively 28 and 29 can be used to indicate an azimuth approach path 30. It will be seen that as both reflectors of a pair use very nearly the same ground reflection zone, their polar patterns will be similarly affected by changes in ground reflectivity. When operating with a radar the correct approach path is indicated by equal brightness of the radar echoes 31 on the radar PPI screen 32. Alternatively these echoes may be displayed on an "A" scan type of radar display; that is a display of half amplitude, or they may be defected and displayed by other more sensitive means involving the use of special radar circuits, developed for these applications.

It is important in this type of application of the Ground Plane Corner Reflector to note that the correct approach channel or path may be identified in a simple non-scanning type of radar provided the reflectors themselves are sufficiently large to be easily identified. Such a radar may have a simple fixed antenna which might be conveniently used in small aircraft or boats. It is also intended that the actual spacing of the two reflectors comprising such a radar beacon may be used in navigation radars to assist in beacon identification.

The properties of the complimentary reflectors described above can be obtained in a single reflector by mechanically moving sections of the dihedral plates at known times in order to switch the beam from one configuration to the other. A movement of only a few degrees from the operative location will render a plate inoperative. FIG. 13 indicates how this technique might be applied in the case of a beacon which indicates an azimuth approach channel. It also shows how the switching period or the switching times can be used for remote indication such as identification or weather prediction. It will be appreciated that by switching such reflectors at predetermined times on a universal time scale, an increased information capacity can be obtained compared with switching for known periods without reference to universal time.

It also follows that a similar type of switching arrangement may be used in a reflector beacon which combines the characteristics of reflectors shown in FIGS. 9 and 10 to indicate a given elevation or glide slope angle.

Figure 14:
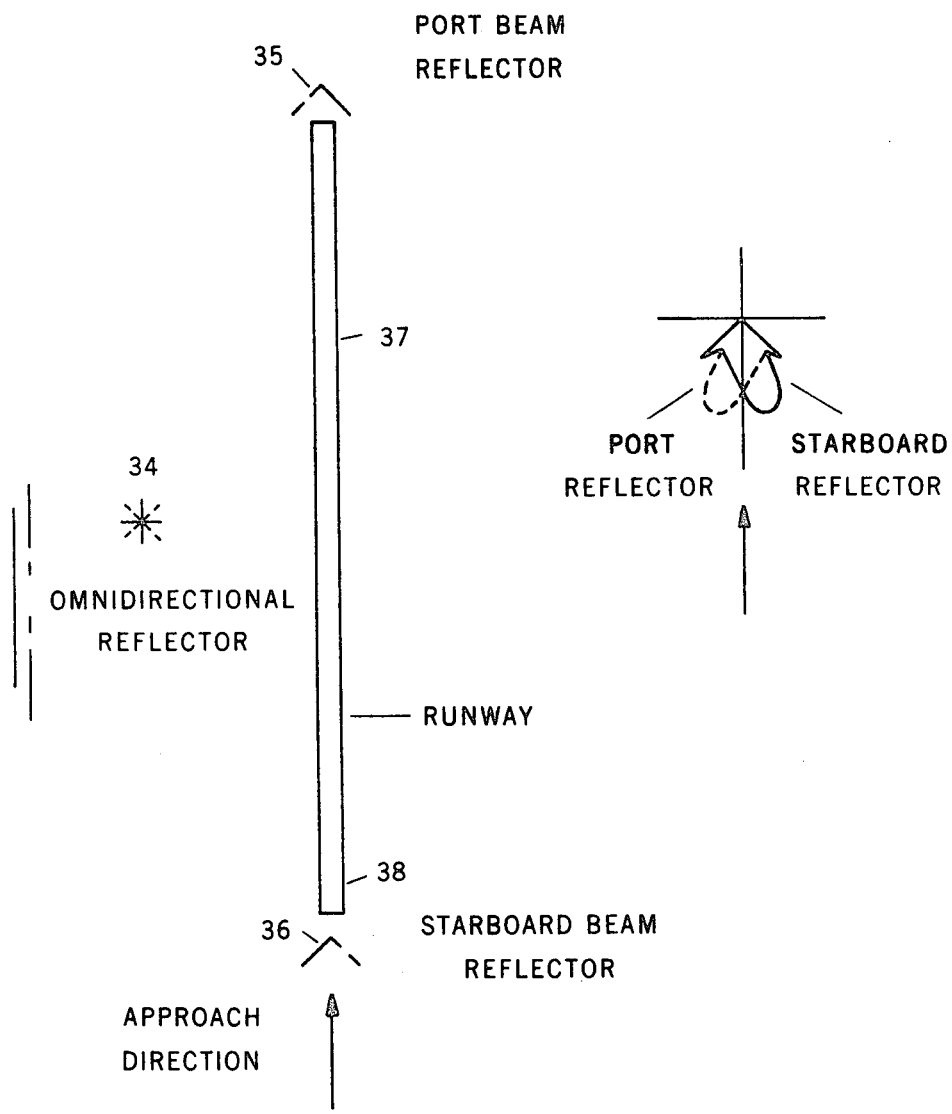
FIG. 14 shows how a group of ground plane corner reflectors can be used to provide a simple approach and landing aid for an airfield by indicating airfield location, runway direction and runway thresholds.

Various combinations of the different types of Ground Plane Corner Reflectors may be employed as navigation aids. FIG. 14 shows how Ground Plane Corner Reflectors may be used to provide a simple approach aid for an airfield. This navigation aid comprises an omnidirectional reflector 34 and a pair of azimuth approach reflectors 35 and 36 which indicate air field location, direction of the runway 37 and touch down position 38.

Figure 15:
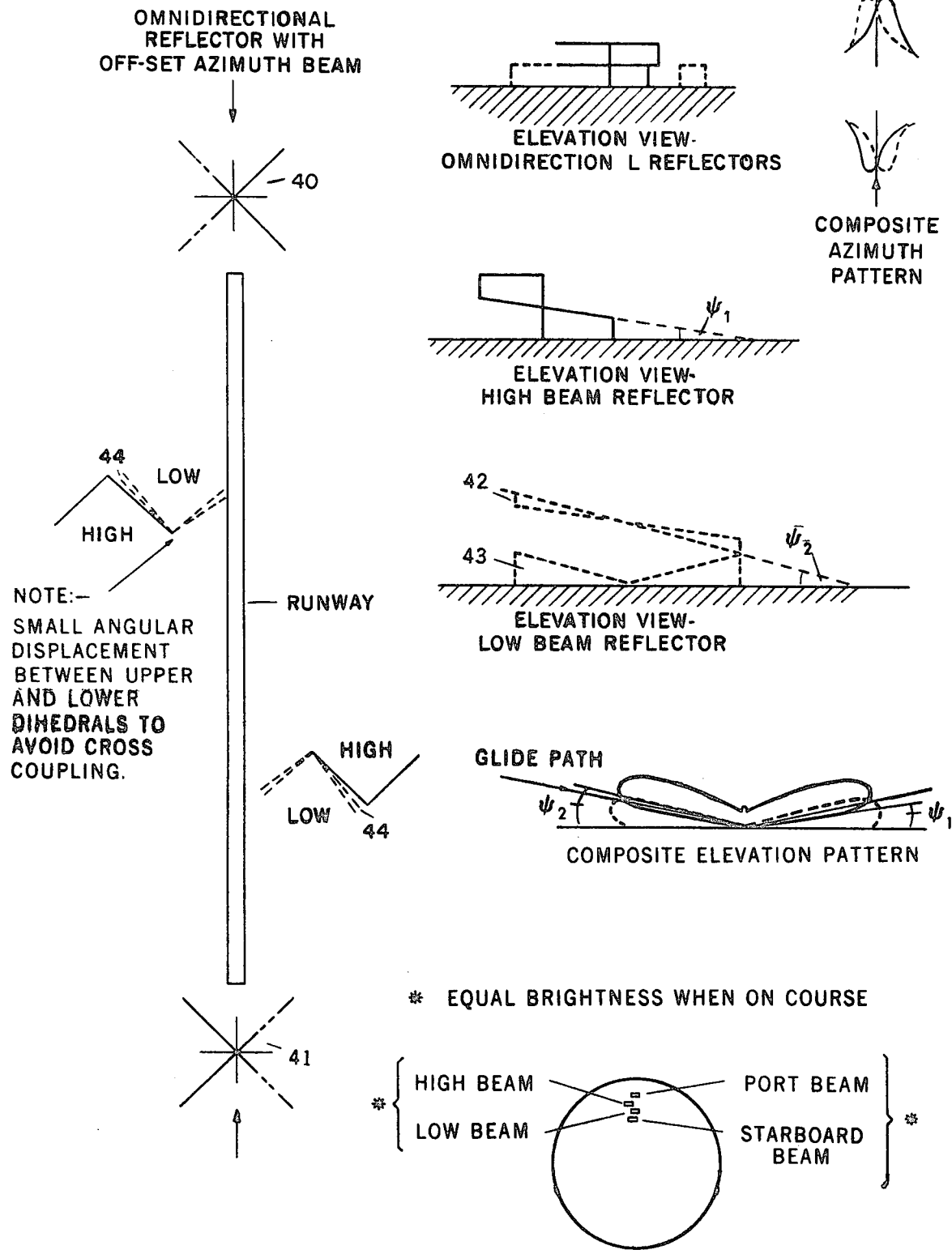
FIG. 15 shows how ground plane corner reflectors can be used to provide a comprehensive bi-directional approach and landing aid for airfields, by indicating airfield location, runway direction, runway threshold, and glide slope angle.

FIG. 15 shows how the different types of Ground Plane Corner Reflector may be used to provide a comprehensive navigation and approach aid to air fields. It also indicates further applications of the technique of adding reflector units to obtain a modified polar pattern. For example, at 40 and 41 are shown a port beam and starboard beam reflector, which are combined with an omnidirectional reflector in order to provide more economically a beacon which is visible from all directions and which also indicates the correct azimuth approach channel. Also at 42 is shown a narrow elevation beam reflector which has been combined with an upper cut-off elevation beam reflector at 43 in order to control the cut-off rate of the low beam beacon. It will be noted that these two reflectors are slightly off-set in azimuth as at 44 so that cross coupling of their ray paths does not occur.

Figure 16:
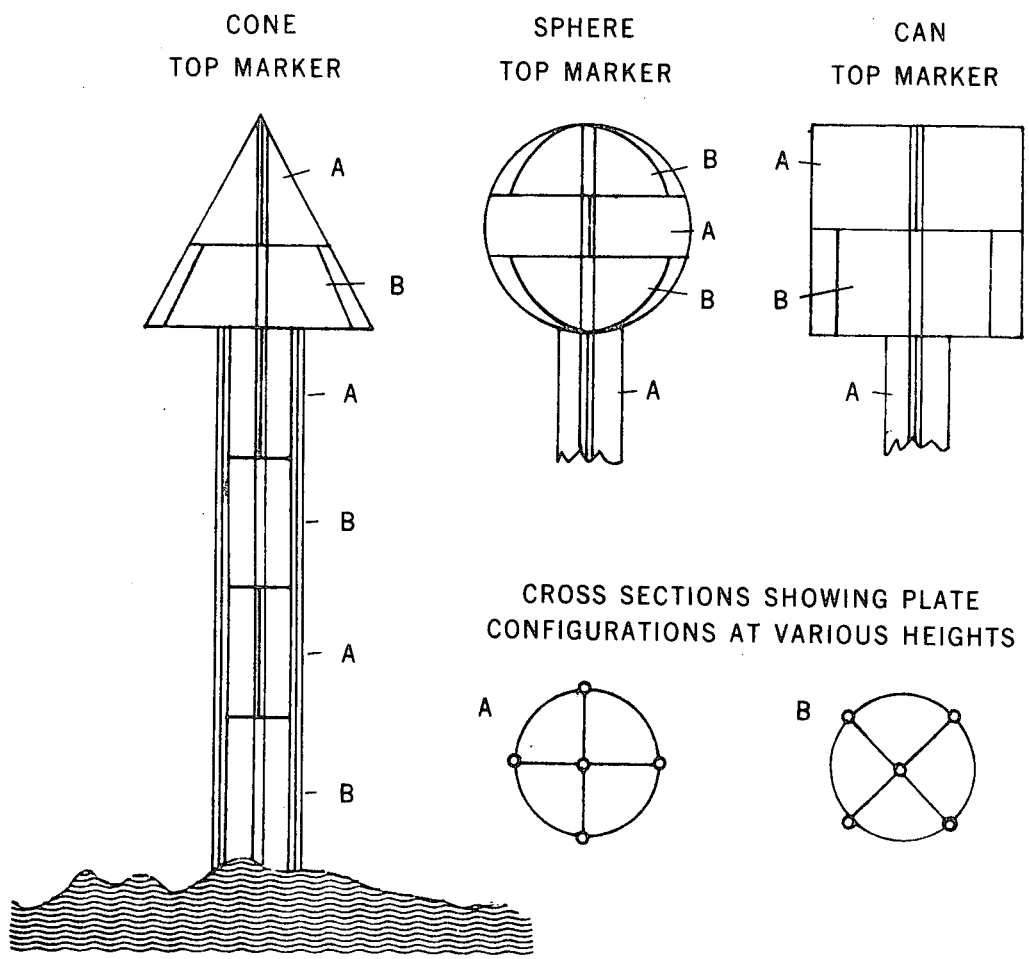
FIG. 16 shows how a group of marine omnidirectional reflector which also acts as a day marker in which the individual sections throughout its length are displaced by 45° and in which the maximum vertical extent is used to make full use of the available illumination intensity (reference FIG. 4).

For marine purposes it is important that all the available height is used in providing a reflector, as shown in FIG. 16, since at long range and hence very small elevation angles the first maximum in the vertical lobing pattern, as shown in FIG. 4, is very high, and that part of the reflector near sea level is therefore poorly illuminated. At shorter ranges and hence greater elevation angles the spacing between maxima in the vertical lobing pattern is considerably reduced and it is important that the full available vertical extent is used to provide reflection to take account of varius positions of the first maximum.

Figure 17:
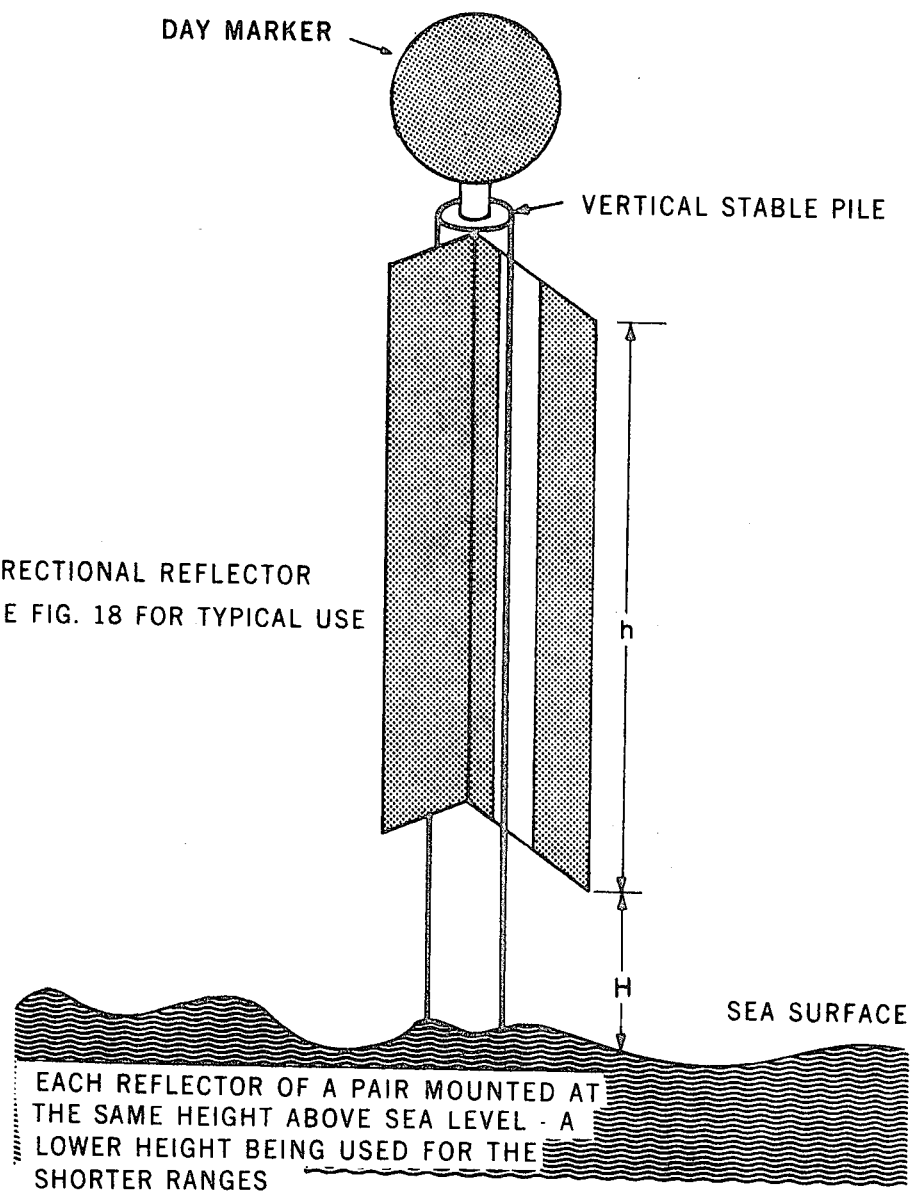
FIG. 17 shows one of a pair of marine ground plane corner reflectors which would be used to define navigation channels as shown for instance in FIG. 18.
Figure 18:
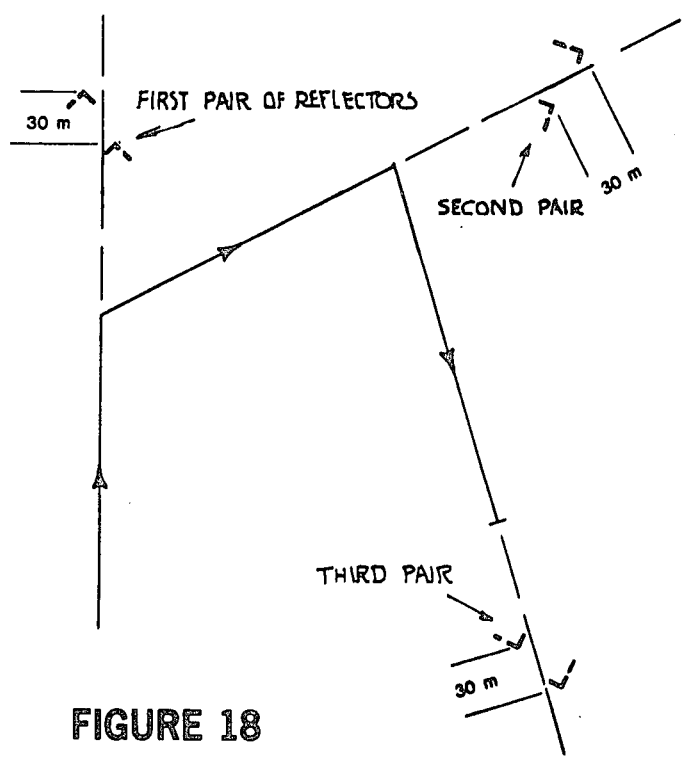
FIG. 18 shows how a radar beacon consisting of port and starboard beam ground plane corner reflectors may be positioned to clearly define a three-leg approach channel, such as an entrance to a harbour.

FIG. 17 shows a marine type of beacon having in this case a starboard facing beam, and FIG. 18 shows how complimentary pairs of these reflectors may be used as shore based beacons to indicate azimuth approach channels, such as at an entrance to a harbour or for river navigation. A 30m separation is shown as this is typically required by marine radars for adequate resolution of the two reflectors in range.

We claim:

1. In a system including a trihedral reflector for reflecting a sonar or radar signal, an arrangement comprising dihedral plates normal to each other and to the earth's reflecting surface to form with the earth's natural reflecting surface a trihedral reflector, the earth's natural surface extending ahead of and beyond the confines of the dihedral plates at elevation angles including angles below the Brewster angle, the signal being reflected once each by the two reflecting surfaces of said dihedral plate and the earth's surface in any order whereby normal and circularly polarized radar transmission is achieved.

2. The system according to claim 1 whereby the plates normal to the ground plane reflecting surface are shaped by omitting sections of their length, or of their height, in order to modify either the azimuth pattern to have a port or starboard facing beam, or the elevation pattern to have a lower elevation angle cut-off or upper elevation cut-off beam respectively.

3. The system according to claim 1 whereby two or more reflectors are used and are mounted at the same height or stacked at different heights, such that their respective phase reference planes are effectively coincident in order that their polar patterns may add without mutual interference to provide reflector beacons having a combined polar pattern without there being interference nulls.

4. The system according to claim 1 whereby a complimentary pair of azimuth beam or elevation beam reflectors or reflector beacons are arranged such that their beams are asymmetrically displaced about a given azimuth approach bearing or elevation approach bearing respectively, and such that each is located at a known separation in a different radar resolution cell, that is in angle and or range, in order to provide a crossover type of a remote indication of the given approach angle, whereby the comparative brilliance or amplitude of the respective radar echoes is used at the navigation radar to indicate the direction of the required change in approach bearing of the aircraft ship or other craft, to navigate to the given approach bearing.

5. The system according to claim 3 whereby the polar pattern of a ground plane corner reflector is changed, or modulated, mechanically for remote indication by positioning sections of the dihedral plates from their normal to a position in which they are no longer effective.

6. The system according to claim 2 whereby the polar pattern of a ground plane corner reflector is changed mechanically for remote indication by positioning sections of the dihedral plates from their normal to a position in which they are no longer effective.

7. The system according to claim 1 whereby a ground plane corner reflector or reflector beacon has a frangible dihedral structure such as to produce a low profile reflector which may be used safely near an airfield runway.

8. The system according to claim 1 wherein the ground plane corner reflector or reflector beacons may be located such that each occupies a separate range resolution cell and such that the group of reflectors or reflector beacons constitute an autonomous air navigation and/or landing aid or marine navigation aid.

9. A ground plane corner reflector comprising at least a pair of reflecting surfaces with a dihedral angle of 90° between at least a plate forming the said surfaces and disposed in turn, at 90° to a part of the earth's natural surface to form with that part of the earth's natural surface a third reflecting surface of a trihedral reflector for radar or sonar transmissions, the earth's natural surface extending ahead of and beyond the confines of the dihedral plates at elevation angles including angles below the Brewster angle whereby spurious transmissions are absent from the reflected beam by applying only the defined surfaces whereby normal and circularly polarized radar transmission is achieved.

10. The ground plane corner reflector of claim 9 wherein the reflective properties of the said natural ground surface are modified to enhance the reflection accuracy of the said natural ground surface.

11. The ground plane corner reflector of claim 9 wherein the said plates are shaped by omitting sections thereof in order to modify the azimuth pattern or the elevation pattern.

12. The ground plane corner reflector of claim 11 wherein the said plates are shaped in length to form a port or a starboard facing beam.

13. The ground plane corner reflector of claim 12 wherein a pair of such corner reflectors are located a known distance apart in two range resolution cells to form both a port and a starboard facing beam to define two sides of a navigation channel.

14. The ground plane corner reflector of claim 11 wherein the said plates are shaped in height in relation to the ground plane reflector to adjust the lower or upper cut-off beam.

15. The ground plane corner reflector of claim 9 wherein sets of reflector plates are stacked one above the other whereby their respective phase reference planes are effectively coincident so that their polar patterns add without mutual interference.

16. The ground plane corner reflector of claim 9 wherein alternate plates of a stacked assembly are orientated at different angles whereby to provide a wide angle reflector.

* * * * *